United States Patent [19]
Baron

[11] 3,985,406
[45] Oct. 12, 1976

[54] CUSHIONED ROLLER CIRCLE

[75] Inventor: George B. Baron, Marion, Ohio

[73] Assignee: Marion Power Shovel Company, Inc., Marion, Ohio

[22] Filed: Apr. 14, 1975

[21] Appl. No.: 567,772

Related U.S. Application Data

[63] Continuation of Ser. No. 380,199, July 13, 1973, abandoned.

[52] U.S. Cl. .................. 308/219; 212/68; 308/237 R
[51] Int. Cl.² .................................. B66C 23/84
[58] Field of Search ............... 212/69, 68; 308/227–231, 219

[56] References Cited
UNITED STATES PATENTS

| | | | |
|---|---|---|---|
| 1,965,407 | 7/1934 | Doughty | 308/227 |
| 2,248,590 | 7/1941 | Smith | 308/219 |
| 2,313,084 | 3/1943 | Manly | 308/196 |

OTHER PUBLICATIONS
Letter of June 20, 1972 from J. L. Whaley to Marion Shovel owner.

Primary Examiner—M. H. Wood, Jr.
Assistant Examiner—Richard A. Bertsch
Attorney, Agent, or Firm—Mason, Fenwick & Lawrence

[57] ABSTRACT

A machine of the dragline, shovel, or crane type having a body rotatably mounted upon a base with a padded live roller circle interposed between the body and base to facilitate rotation of the body. The roller circle includes flat, segmental upper and lower rails with resilient and compressible pads between the rail segments and the respective body and base, and a roller cage between the rails having rollers which are generally cylindrical and in bearing contact with the rails, the rail segment pads permitting movement of the segments to distribute local loads to adjacent rollers. The rails are clamped to the body and base by means of yieldable clamping means, and the cage is guided in its circular travel path by yieldable guide means.

17 Claims, 6 Drawing Figures

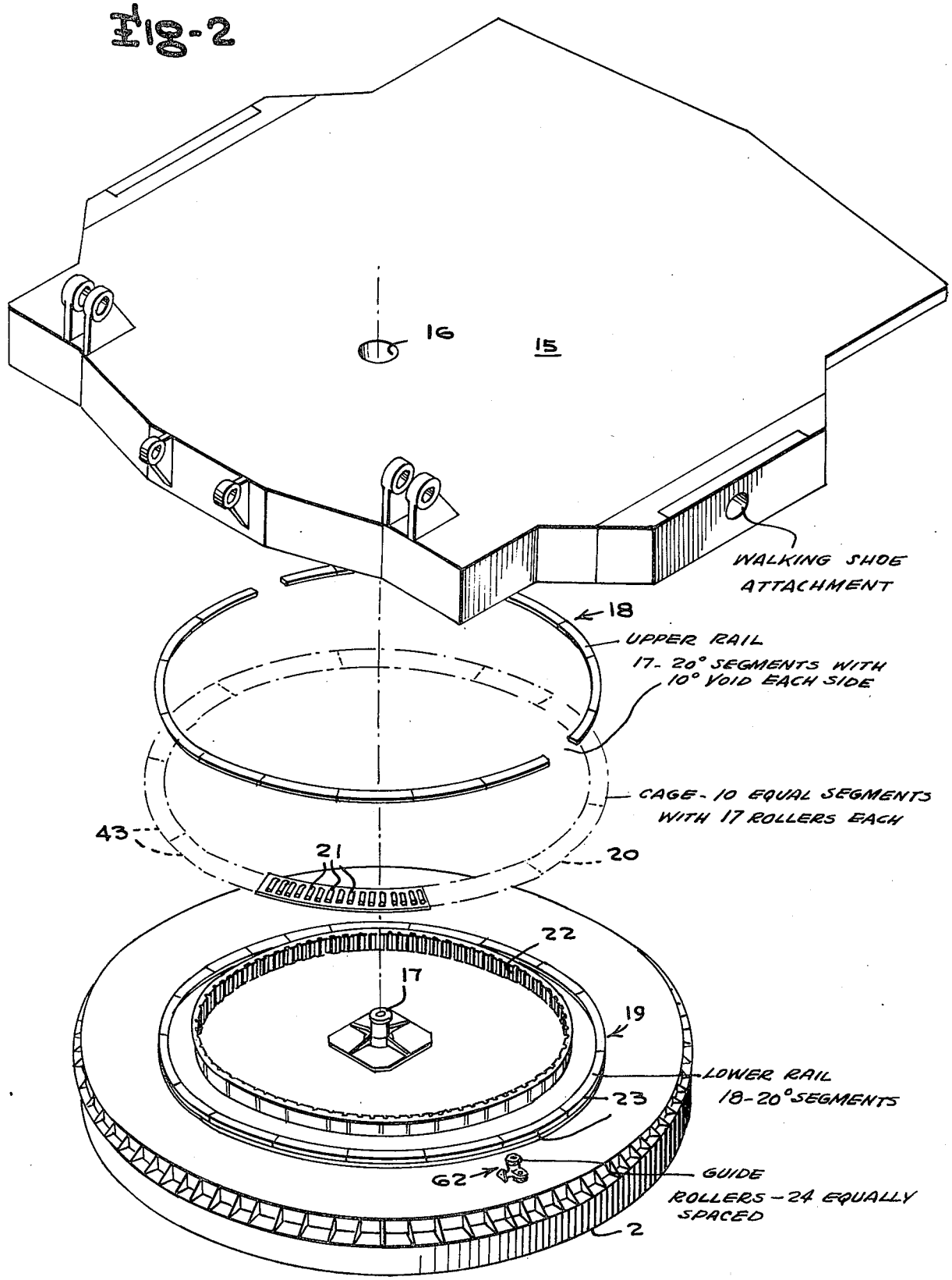

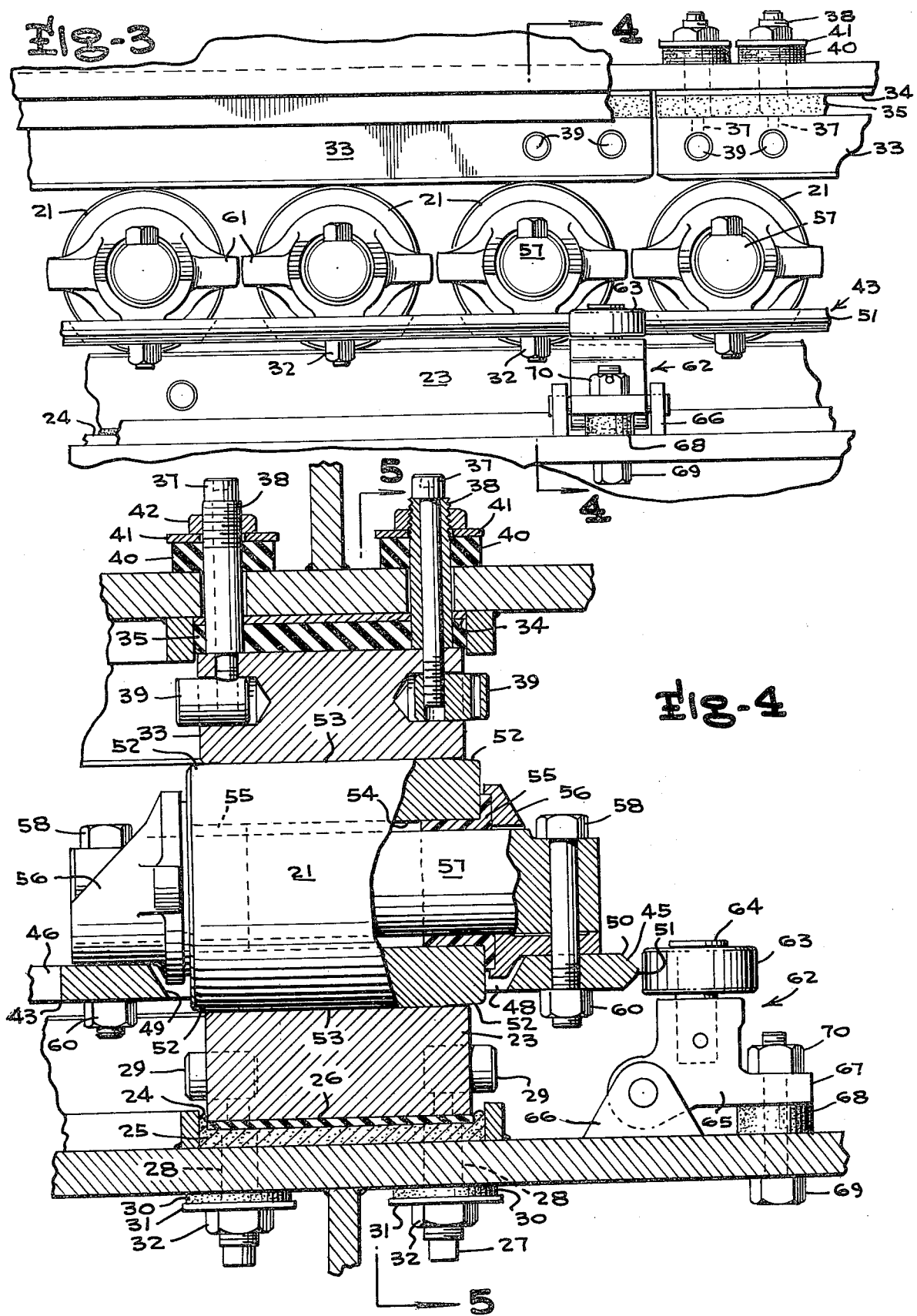

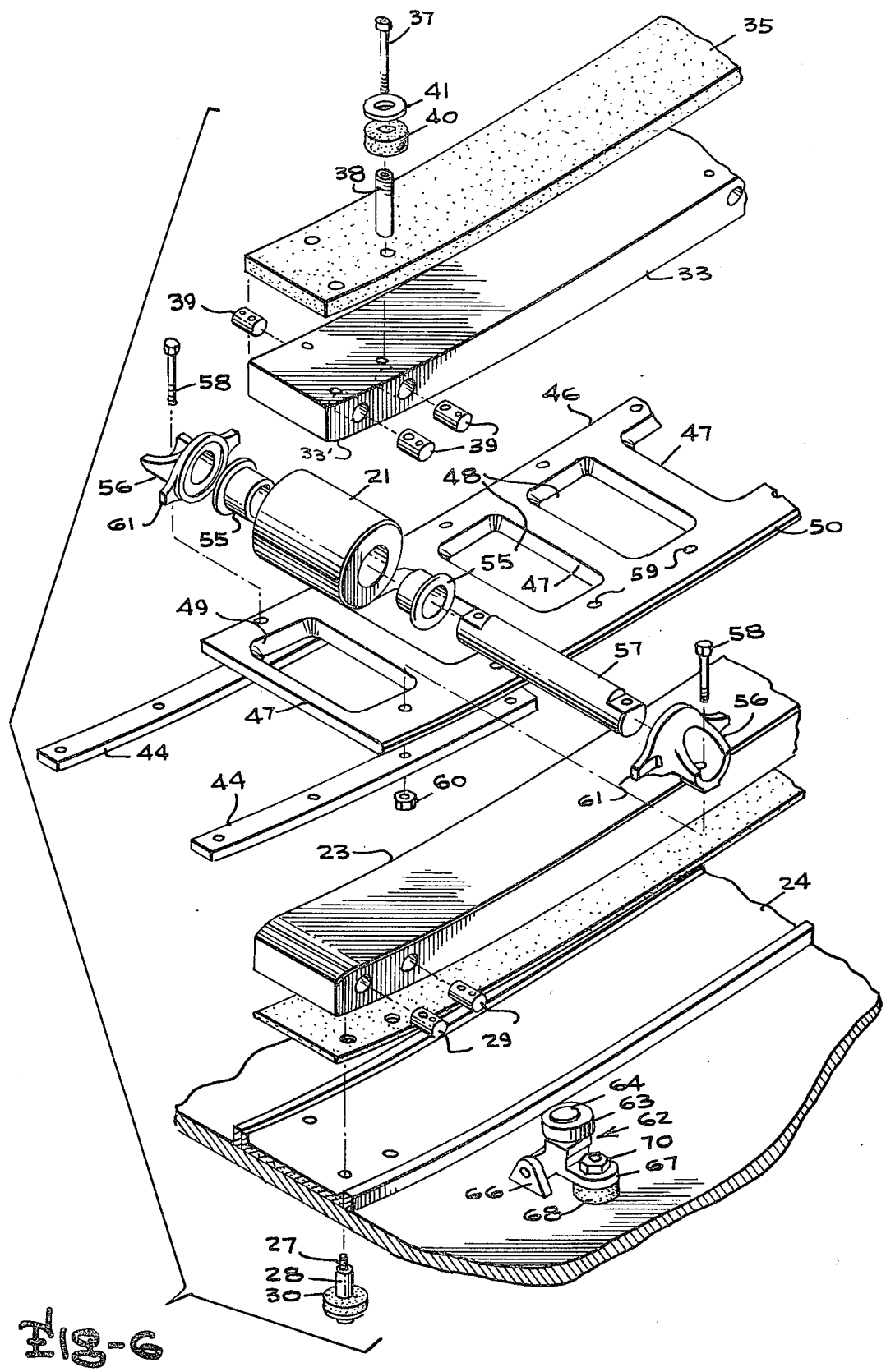

CUSHIONED ROLLER CIRCLE

This is a continuation of application Ser. No. 380,199, filed July 13, 1973 now abandoned.

BACKGROUND OF THE INVENTION

This invention relates to excavating and similar type machines, which have bodies carrying loadsupporting booms, or projections, extending at one end, the bodies being mounted for rotation upon a base, and more particularly to the mounting which supports, and permits rotation of, the body on the base.

Excavating machines, either draglines or shovels, have houses enclosing the operating machinery, with the houses being supported upon bases by means of roller circles serving as anti-friction bearings as the houses rotate about central, vertical pivot shafts carried by the bases. Due to the fact that long, inclined booms are attached at their bottoms to the fronts of the houses, and excavating buckets and their loads are suspended from the booms at some distance forward of the houses, the loads imposed upon the roller circles are offset from the center of house rotation, with the points of greatest load shifting about the roller circles as the houses are rotated. The resulting uneven, constantly shifting, weight distribution about the circle has presented many problems in roller circle design and operation.

The problem has increased enormously as the size and weight of the machines have grown over the years. With the requirement for machines having tremendous bucket capacity, resulting in machines weighing millions of pounds, the problem has become quite critical.

In order to solve the problem, a live roller circle has been used. It consists of a circular rail attached to the underside of the upper frame, resting on a complete circle of rollers (usually forty or more, guided and/or separated by a cage) which in turn rests upon a circular rail mounted upon the top of a lower frame, or tub in the case of a dragline. It is called "live" in order to distinguish it from other arrangements in common use in which rollers are mounted on shafts fixed to the upper frame. Ordinarily, it is made to withstand only downward loads, the other possible loads (radial and upward) being taken by a journal and a thrust face at the center of rotation. A live roller circle thus resembles a very large roller thrust bearing, but with the following differences in detail and application. First, the rails for the live roller circle usually are made in segments and some segments are usually left out of the upper rail at the sides of the upper frame; and, second, the centroid of the load does not remain at, or near, the center of rotation, as in an ordinary thrust bearing, but moves forward or rearward a considerable distance, even going out beyond the edge of the circle in extreme instances.

In order to design a live roller circle for adequate life, it is necessary to compute loads which individual rollers must withstand. In such computations, it is customary to assume that the upper and lower frames are uniformly elastic in the load-carrying regions above and below the roller circle. Thus, if the centroid of the load is ahead of center, the roller or rollers at the front of the circle would be most heavily loaded, and roller loads would diminish toward the rear. In other words, the circle as a whole would be treated as a beam or column section under an offset compressive load.

For many years it has been known that the actual load distribution is quite different from the ideal, and that maximum individual roller loads are often as much as twice those which would be computed by the classical beam theory. There are two main reasons for this. First, the frames are not uniformly elastic, and loads tend to be concentrated on parts of the roller circle which are located directly below or above areas where heavy loads are applied to the frames, such as at the foot of the boom; and, second, the rail paths, or surfaces, to which the rails are attached, are not initially flat, since it is very difficult to build structures as large as these frames with the relative precision usually associated with anti-friction bearings.

To improve roller load distribution, efforts in recent years have taken the following approaches:

1. Make the frames deeper, thus stiffer against gross bending deflection and better able to spread out loads around the circle. A deeper frame also has greater "local" softness over the circle, because it has greater depth of web which is subjected to direct compressive load.

2. Apply loads to the upper frame at more logical locations, with relation to the roller circle. This has been done to some extent by relocating boom foot mountings, gantry and mast locations.

3. Machine the rail paths at the erection site, after the frames are completely assembled and welded, using optical instruments to check flatness.

None of these has completely solved the problem, and the field machining is a very expensive, time-consuming operation.

Because of the inability to achieve true flatness in the circle rail, or in the taper angle of tapered rollers if used, it has been necessary to use fully crowned rollers to prevent all of the roller load being imposed near one end of the roller, resulting in destructively high contact stress. Even without geometric errors, the occasional instance of the centroid moving to the edge of the circle and the resulting take-up of clearance on the thrust fact at the center journal will cause enough tipping movement to chase the roller load to the outer end. Fully crowned rollers, when loaded, have a contact area against a flat rail which is elliptical, with the greatest width and highest shear being developed only at the center. This is in distinction to a straight roller with crowned ends which will carry more load at the same stress level, because the contact area has an oval shape with stress being uniform over a considerable length.

Another problem encountered is the tendency for rail segments to creep against the frame and wear into it. This occurs principally because the frame surface undergoes strains, or elastic changes of length, as the machine works. The rail segments, being long and heavy, and not completely integral with the frame, do not change length very much. Therefore, one end or the other of a segment will move very slightly with respect to the frame. Then, when the roller load happens to be greater on that end, the frame strain may suddenly be relieved, causing the other end of the segment to move.

SUMMARY OF THE INVENTION

The principal object of the present invention is to provide an improved live roller circle mounting for excavating and similar machines which will be free of the objections mentioned above.

A more specific object is to provide a padded live roller circle which will more evenly distribute the machine load about the roller circle during machine operation.

Another object is the provision of a roller circle incorporating resilient and compressible pads between the rails and frames, increasing the local softness of the rail-frame combination by a whole order of magnitude, and loads which would otherwise tend to be concentrated on one or two rollers are forced to spread out and be shared by several more.

A further object is to provide a roller circle in which the lower rail can be made precisely flat without machining.

It is also an object to provide such mechanism wherein straight contour rollers can be used safely.

A still further object of the invention is to provide a live roller circle for excavating and similar machines in which the rail segments will be substantially free of creep against the frame, and strains in the frame will cause only shear deflection without slipping.

Other objects of the invention will become apparent from the following description of one practical embodiment thereof, when taken in conjunction with the drawings which accompany, and form part of, this specification.

BRIEF DESCRIPTION OF THE DRAWINGS

FIG. 2 is an exploded perspective view of the improved roller circle;

FIG. 3 is a partial side view of the roller circle;

FIG. 4 is an enlarged vertical section through one side of the roller circle, taken substantially on the line 4—4 of FIG. 3;

FIG. 6 is an exploded perspective view of portions of an upper rail segment, roller and roller cage, and lower rail segment.

DESCRIPTION OF A PREFERRED EMBODIMENT

Figure 1:
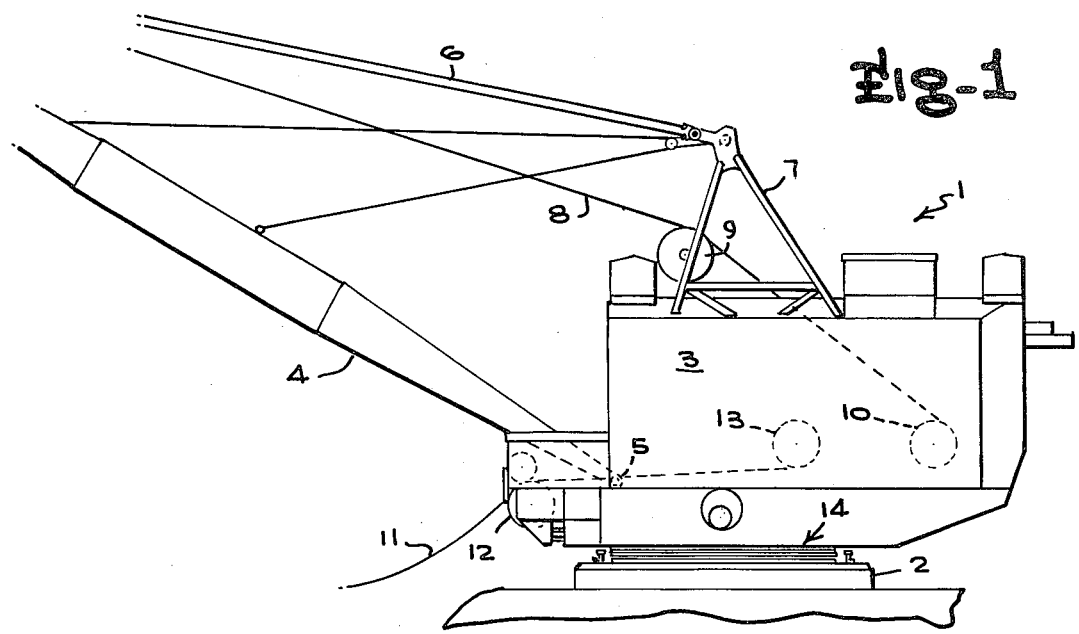
FIG. 1 is a somewhat schematic side elevation of a dragline excavating machine of the type with which the present invention may be used, and embodies the principles of the present invention.

Referring now to the drawings in detail, and adverting first to FIG. 1, there is shown diagrammatically a portion of a dragline excavating machine 1. The machine consists of a tub-type base 2, which rests upon the ground and supports machinery, or works, house 3. The house has a boom 4 projecting upwardly from the lower front of the house, the boom having its foot connected to the house by foot pins 5. The boom is held at the desired angle of inclination by means of pendants 6 extending from the boom to a gantry 7 mounted on top of the house. A bucket, not shown, is suspended by hoist lines 8 which pass over boom point sheaves, not shown, and over sheaves 9 on the gantry legs to wind on drums 10 in the house. The bucket is dragged toward the machine by draglines 11 passing over fairleads 12 near the boom foot pins and onto winding drums 13 in the house. The house is rotatably supported on the base tub by means of a padded live roller circle 14 which is the principal subject matter of this specification.

It is to be understood that the dragline 1 is merely illustrative of any machine which has a body rotatably mounted on a base, wherein the body (in the present instance house 3) has a load-supporting member projecting outwardly from one end (such as boom 4) whereby major loads are located outside the roller circle and are carried to the circle, so that the weight centroid is not coincident with the turning axis of the roller circle. This could be a dragline, shovel, crane, etc.

Although the boom lies almost entirely outside the roller circle, and the load bucket hangs from its outermost tip, or point, the weight of the boom is largely transferred to the house at the foot pins, while the remaining weight of the boom and the bucket and load is imposed on the house at the gantry. Both loads become compression loads on the roller circle, applied to the circle at points vertically beneath the foot pins and gantry. With conventional live roller circle construction, these loads are imposed on the rollers of the circle directly beneath the areas of load location. As the house rotates, the load upon the roller cicle moves also, but remains localized without noticeable distribution over adjacent areas. This is an over-simplification of the problem, because house weight and the location of the house center of gravity relative to the rotation axis have not been taken into consideration. It will serve, however, to illustrate the shift of weight load on the roller circle, without distribution over an appreciable area of the circle and consequent reduction of load force at the points directly beneath load imposition.

Turning now to the remaining figures of the drawings, there is shown a specific embodiment of a padded live roller circle, wherein resilient and compressible material is included in the rail segment mountings to allow some vertical movement to the rail segments under heavy load to cause part of the load normally imposed upon one or two rollers to be spread to adjacent rollers progressively as the load increases. Thus the load upon rollers directly beneath the points of load application is decreased.

Referring particularly to FIG. 2, it will be seen that a platform 15 at the bottom of house 3 is apertured at 16 to receive a center journal 17 mounted on the top of tub 2. This provides the turning axle for the house, so that the house may rotate relative to the tub. No details of the center post or its bearing in the platform have been shown as this is not part of the improved structure. An upper rail 18 is mounted beneath the platform 15, concentric to the turning axis, and a lower rail 19, concentric to the upper rail and turning axis, is mounted on the upper surface of tub 2. A roller cage 20, carrying rolles 21, is mounted between the upper and lower rails with the rollers in rolling, bearing contact with the upper and lower rails. A suitable ring gear 22 may be fixed to the tub about which pinions, not shown, carried by the house may travel to rotate the house.

FIGS. 3 through 6 show the roller circle assembly in detail.

Lower circle 19 is composed of a plurality of segments 23 of equal length, arranged in circular pattern. The rail segments are seated in an annular channel 24 fixed to the tub surface. A level rail seat is obtained by means of a layer of poured epoxy grouting 25 within the channel. The poured grouting will form a perfectly level rail seat without the need for machining. A resilient and compressible pad 26 lies between the grouting and the rail segments. The segments are held in place by means of bolts 27 which pass through threaded sleeves 28 and are screwed into cross-tapped pins 29 seated in apertures in the segment sides. Sleeves 28 extend through the tub material, or frame, and are surrounded by resilient and compressible washers 30 adjacent their threaded ends, which bear against the tub, or frame, under surface. Metal washers 31 seat upon the washers 30, and nuts 32 are threaded on the sleeve ends to place desired pressure on the washers 30. Thus, each rail segment has a "floating" seat upon the tub. The nature and purpose of the resilient and compressible pads 26 and washers 30 will be discussed later.

Upper rail 18 is also composed of a plurality of segments 33. Here, again, the segments are seated in an annular channel 34 carried beneath the upper machine frame, or platform. Within the channel, there are resilient and compressible pads 35, against which the rail segments 33, each having rounded lower corners 33', bear. In most instances, the pads 35 will be considerably thicker than pads 26 under the lower rail segments. Where required, steel shims 36 may be used between the pads 35 and the channel seat, to level the segments of the rail. The upper rail segments are held in position by means similar to that holding the lower rail, consisting of bolts 37, threaded sleeves 38, resilient and compressible washers 40, metal washers 41 and nuts 42. It will be seen that the upper rail segments are also mounted to have a floating seat.

The segments of the upper and lower rails may be of different arcuate extent, so that the gaps between them are not in vertical alignment, even during rotation of the house. In conventional manner, there may be gaps at the sides of the upper rail.

Roller cage 20 is mounted between the two rails, with rollers 21 carried by the cage in bearing contact with the rails. Due to the fact that the rail segments are capable of some vertical movement, it is not necessary that the rail supporting surfaces be machined to make them perfectly level. The segments will adjust to unlevel conditions and to shifting weight during machine rotation. The floating nature of the rail mounts permits the use of plain cylindrical rollers. This, in turn, precludes the need for outer surface machining of the rails, as has been required where flanged rollers were employed. Instead, an unmachined roller cage can be used with appropriate guide means. External guide rollers, or shoes, can be fixed to the tub and bear against the cage periphery. Normally, this would require that the cage periphery be truly circular. However, a rather large concentricity tolerance can be applied, for the following reasons:

1. The rollers, or shoes, can be resiliently mounted, so that if there is a high spot on the periphery of the cage, it will simply deflect them without any destructive loads. 2. The cage can be made of soft steel, and the more prominent high spots will soon be upset or worn away.

3. It is not necessary that the cage touch all guide rollers simultaneously.

The cage and roller assembly and guides shown on the drawings will work quite well.

Figure 5:
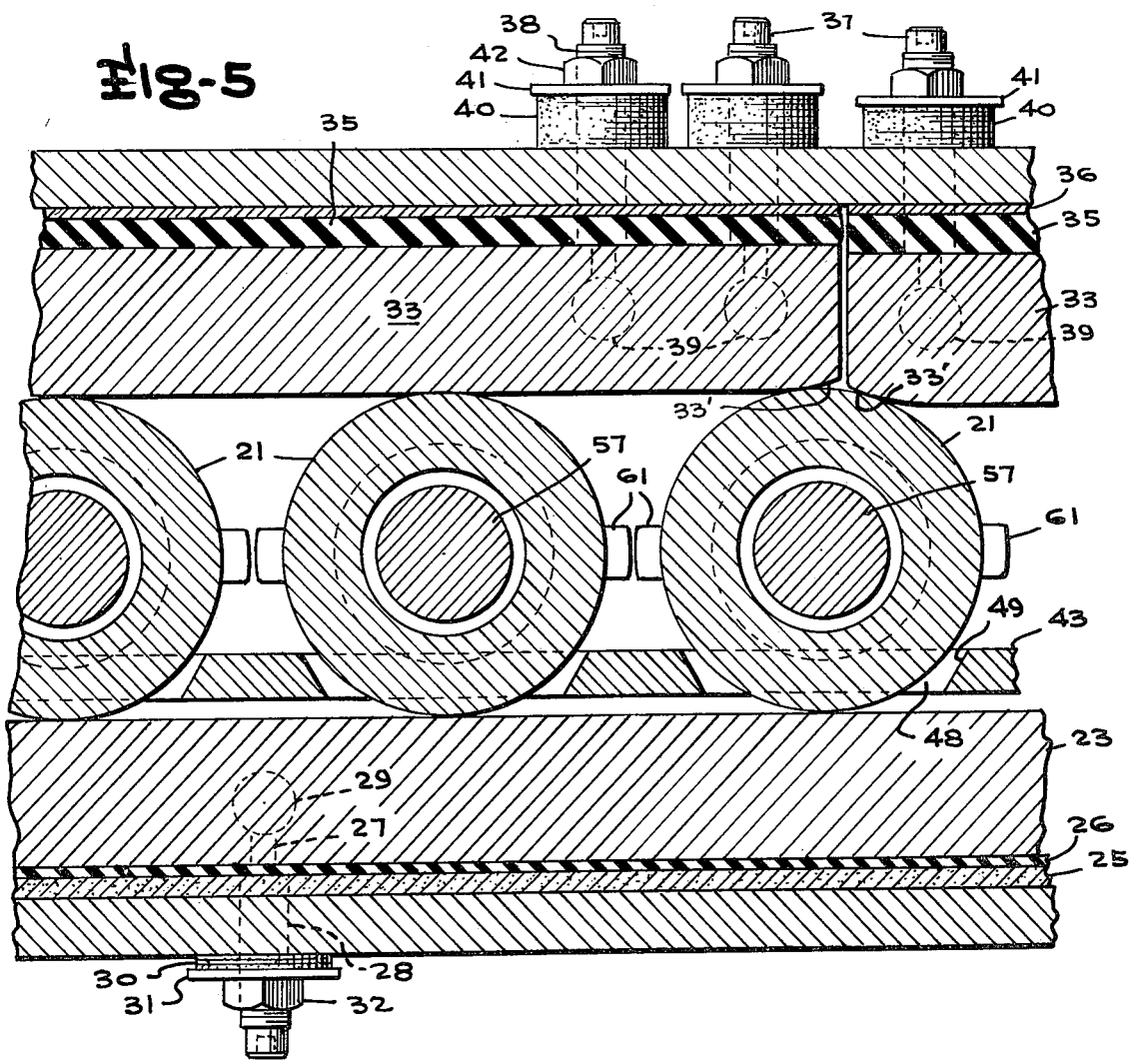
FIG. 5 is a section through the roller circle, taken at right angles to that of FIG. 4 approximately along the line 5—5 of FIG. 4.

The cage 20 is also made of a plurality of segments 43, joined at their ends by splice bars 44. (See FIG. 6) The number of segments will be chosen so as to carry out the policy of staggered rail segments and roller positions. The number of rollers per cage segment also will be chosen with the end in view of smooth transition from rail segment to rail segment. Each arcuate cage segment will comprise, in effect, arcuate side rails 45 and 46 joined at equi-spaced intervals by end and intermediate radial cross-members 47. This configuration provides a plurality of spaced, substantially rectangular roller seats 48. The cage is designed to be positioned well down below the plane of the rotational axes of the rollers, as can be seen in FIGS. 3, 4 and 5, and the side edges of the roller seats are downwardly and inwardly tapered, as at 49, to conform generally to the roller periphery. Such a cage will have the advantage of being stiff in its own plane to coact with centering guides, and the required peripheral circular accuracy can be obtained by jig drilling for mounting the rollers and for splice bar connection. Jigs for drilling the cage segments can be used which register against the outer segment edge near each end. Thus, there will be at least two points on the periphery which are on the desired true circle, and the joints will match well. The outer edges of the cage segments are bevelled, as at 50, to provide initially a very narrow surface 51 against which guide rollers can bear. If there are high spots on the periphery, upsetting of the cage material will occur and the bearing surface 51 will become as wide as necessary to carry the load. To assure this, the guide rollers will be much harder than the cage plate.

Rollers 21 are substantially cylindrical, but they do have their end areas relieved, as shown by the curvature 52. Nevertheless, they do have broad, flat, central, bearing areas 53 for contact with the upper and lower rails. Each roller has an axial bore 54, and bushings 55 fit into the ends of this bore. A seat casting 56 fits onto each bushing, and a shaft 57 extends through the roller, bushings and seat castings. The shaft ends have diametrical openings to receive mounting bolts 58 which pass through holes in the seat castings, to hold the castings against rotation, and through jig-located mounting holes in the cage plate. Nuts 60 securely hold the assembly together. Each seat casting 56 has horizontally projecting lugs 61 at the level of the roller axis, with the lugs of the castings of adjacent rollers having only slight space between them. This allows free cage movement, but prevents serious deflection of the cage in the event of an accident, such as a roller running over a large foreign object.

At spaced points in a circular pattern on the tub 2, cage guide roller assemblies 62 are mounted. These take the form of guide rollers 63 mounted on vertical shafts 64 on bell-cranks 65. The bell-cranks are pivotally mounted in ears 66 on the tub, and have arms 67 which extend substantially parallel to the tub surface outwardly from the roller cage 20. A pad 68 of resilient and compressible material is located between the tub surface and the crank arm 67, and a bolt 69 extends through the crank arm, pad and tub structure. A nut 70 holds the crank arm against the pad and limits the movement of the guide rollers 63 toward the guide surface 51 of the roller cage. The resilient and compressible nature of the pad 68 allows the guide roller to move back when high spots of the cage are encountered, or if rocking of the cage occurs due to a loose center journal, while exerting enough force to keep the cage reasonably well centered.

The above-described padded live roller circle assembly produces a much wider distribution of weight about the roller circle, due to the use of the resilient and compressible pads. The compression of a pad in one area causes increased load upon adjacent rollers, because the rail segment movement tends to distribute to adjacent segments, for the heavily loaded segment causes greater compression of its mounting pad.

The above-described action is to be distinguished from that obtained from the use of padding for the supports for the rails of overhead cranes and the like, where the purpose is to reduce noise and wear of the rail. There the load is imposed only on a minor span of the straight rail with equal load being on all wheels. In the present instance, the load is unequally applied about a circle, and the purpose is to distribute the load over a greater arc of the circle.

Another result of the padded construction is the elimination of the need for frame machining. This is a tremendous saving on very large machines where such machining has to be done after assembly in the field.

The flat padded rail construction allows use of cylindrical rollers with consequent saving in roller cost and elimination of rail periphery machining, while achieving the greater load-bearing qualities of cylindrical rollers.

While the construction shown incorporates padding between both rails and their seats, it is to be noted that the lower rail padding is much thinner than that used with the upper rail. In this construction, the lower padding is used primarily to protect the grout which provides for level seating of the lower rail. It is to be understood, however, that it is contemplated that padding may be used with the upper rail alone, the lower rail alone, or with both rails.

The material used for padding is important. It must be resilient and compressible. A sheet of solid rubber, or any other solid, homogeneous material is practically incompressible, and no deflection can take place unless the displaced volume is allowed to flow laterally, which it will not do if the sheet is very wide. Therefore, if homogeneous solid materials, such as rubber, neoprene or polyurethane, are to be used they must be divided into small, separate units, or blocks, which can bulge when they are compressed. An available material works quite well, however. This is a resilient compressible material made of plies of cotton duck impregnated with a mixture of natural and synthetic rubber. It is made in sheets of various thicknesses, which may be cut easily to any desired shape and stacked to any desired height. It is compressible because the cotton plies are not completely saturated with rubber, and the sheet is, therefore, somewhat porous. When it is compressed under load, the rubber, which in itself is practically incompressible, flows elastically into the pores. This material will withstand about 20,000 psi static compression before it breaks down, and can be subjected to repeated loads of 2000 psi for many years, according to the manufacturer. It has a non-linear characteristic. It compresses 7 percent at 600 psi and 14 percent at 2000 psi. It also has hysteresis, such that a sudden release from 2000 to 600 psi leaves the material still compressed about 10.5 percent.

The use of padding between the rail and its seat requires the use of padding in the rail clamping means. The padded clamps shown and described above provide the necessary action, while permitting the use of excellent rail design and efficient, troublefree clamping.

It is generally agreed that forged rails are better than cast ones. Therefore, it is desired to use them, while keeping their cost reasonable by making them in the simplest possible shape, with a very minimum of machining. The simplest shape, of course, is a plain rectangular section. In order to clamp such a rail to the frame reliably, so that it will not fall or jump out of place when it becomes unloaded, some kind of holes or slots must be provided. It is undesirable to interrupt the working surface, and countersunk bolts are thus ruled out. Tapped holes in the rail are impractical, because of the hardness. Plain holes can be drilled, however, before the piece is heat treated.

In the illustrated structure, holes are drilled in the sides of the rail and nuts, in the form of cross-tapped pins are inserted, as above-described, with the tapped openings in the pins communicating with holes drilled from the non-working surface of the rail. If the securing bolts were tightened against resilient washers, the resulting cyclic variation in the bolt load will cause failure at the thread roots. Therefore, the bolt is tightened against a threaded sleeve, as described, and enough preload is applied to the bolt to preclude loosening or fatigue failure. Then, in order to apply the correct amount of squeeze to the resilient washer, a locking-type nut is run down on the threaded sleeve. The sleeve threads will not fail because they are under compressive load from the bolt.

Actual tests have been made of live roller circles without and with padding. These showed that without padding the maximum observed roller load was 1.89 times the maximum theoretical load. With padding, it was 1.53 times, or a 19 percent reduction. This is conclusive proof that the peak load is distributed over wider areas. Graphs, prepared from gage readings during 360° rotation of the machine, with and without padding, show much wider load distribution during full rotation when padding is used. The results indicated the padded rail segments moved to compensate for machine errors and frame deflection, as well as to achieve wide load distribution.

While in the above one practical embodiment of the invention has been disclosed, it will be understood that the specific details of construction shown and described are merely by way of example, and the invention may take other forms within the scope of the appended claims.

I claim:

1. In a machine such as an excavator or crane having an upper frame provided with an eccentrically disposed load centroid, rotatably mounted on a lower frame, an assembly for supporting said upper frame and other components mounted thereon on said lower frame comprising a lower circular rail consisting of a plurality of arcuate segments disposed in end to end relation secured to said lower frame, a cage having a plurality of rollers disposed in contact with an upper bearing surface of said lower rail, an upper rail consisting of a plurality of arcuate segments disposed in end to end relation secured to said upper frame, having a lower bearing surface in contact with said rollers, and padding consisting of an elastically deformable material interposed between at least one of said upper and lower rails and an adjacent upper or lower frame, said material having sufficient strength to support the design load imposed on said rollers, sufficient elasticity to permit vertical and horizontal displacement between each segment of said rail and said adjacent frame and a sufficiently low modulus of elasticity to effect a more uniform distribution of the load imposed on said rollers.

2. A support assembly according to claim 1 wherein said elastically deformable material includes voids in which said material flows when under load thereby avoiding lateral deflection of said material.

3. A support assembly according to claim 2 wherein said elastically deformable material includes plies of fabric.

4. A support assembly according to claim 1 wherein said elastically deformable material consists of rubber and includes therein plies of cotton duck partially impregnated with rubber.

5. A support assembly according to claim 1 wherein said padding of elastically deformable material is interposed between said lower rail and lower frame and said upper rail and upper frame.

6. A support assembly according to claim 1 wherein longitudinally spaced, inner edges of said rail segments are relieved to eliminate stress concentrations along said edges as said rollers pass from each of said segments to a successive segment.

7. A support assembly according to claim 1 including means for clamping said rail segments to said frames, said clamping means having padding of elastically deformable material disposed between said clamping means and said frames whereby said rail segments are secured to said frames in displaceable relation.

8. A support assembly according to claim 1 including at least one means for yieldingly clamping said rail segment to the adjacent frame, said yieldable clamping means comprising a bolt with a head, passing through an opening in said adjacent frame and threaded into said rail segment, a sleeve disposed on said bolt and interposed between said bolt head and said rail segment, a washer consisting of an elastically deformable material disposed on said sleeve and engaging said adjacent frame, and a nut threaded on an outer end of said sleeve, engaging said washer to place said washer under a desired compressive load.

9. A support assembly according to claim 1 wherein said padding of elastically deformable material is interposed between each of said upper and lower rails and the frame adjacent thereto, and including means for yieldably clamping each of said rail segments to the frame adjacent thereto.

10. A support assembly according to claim 1 wherein said roller cage comprises a plurality of arcuate segments connected together in end to end relation, each of said roller cage segments having a plurality of arcuately spaced roller receiving openings and means for rotatably mounting the rollers within said cage openings.

11. A support assembly according to claim 10 wherein the plane of said roller cage segments is displaced vertically relative to the axes of rotation of said rollers whereby said rollers are disposed in close proximity relative to each other.

12. A support assembly according to claim 10 including means mounted on one of said upper and lower frames and engagable with said roller cage segments for guiding said roller cage about a circular path of travel.

13. A support assembly according to claim 12 wherein said guiding means yieldably engage said roller cage.

14. A support assembly according to claim 12 wherein said guiding means for said roller cage comprises a plurality of circumferentially spaced bell cranks pivotally connected to said lower frame, each of said bell cranks having one arm thereof carrying a guide roller engagable with a peripheral surface of said roller cage and a second arm overlying said lower frame, and padding consisting of an elastically deformable material disposed between said second arm and said lower frame to urge said guide roller into yielding engagement with the peripheral surface of said roller cage.

15. A support assembly according to claim 14 wherein the outer edges of said roller cage segments are bevelled to provide a narrow guide surface engaged by said guide rollers.

16. A support assembly according to claim 1 wherein said lower frame is provided with a circular layer of grouting, padding of elastically deformable material is seated on said layer of grouting and said lower rail is seated on said padding.

17. A support assembly according to claim 16 wherein said lower frame is provided with a circular channel and said grouting is disposed in said channel.

* * * * *